United States Patent [19]

Iobst et al.

[11] 4,119,594

[45] Oct. 10, 1978

[54] CATALYZED ONE-SHOT SYSTEM FOR MOLDING THERMOSET POLYURETHANES

[75] Inventors: Stanley A. Iobst, Sterling Heights; Howard W. Cox, Birmingham, both of Mich.

[73] Assignee: General Motors Corporation, Detroit, Mich.

[21] Appl. No.: 802,139

[22] Filed: May 31, 1977

[51] Int. Cl.² ............................................. C08G 18/22
[52] U.S. Cl. ............................ 260/18 TN; 260/37 N; 528/55; 528/60; 528/77; 528/85
[58] Field of Search ........ 260/18 TN, 47 CB, 75 NB, 260/77.5 AB, 37 N

[56] References Cited

U.S. PATENT DOCUMENTS

| 3,016,364 | 1/1962 | Muller | 260/47 CB |
|---|---|---|---|
| 3,203,932 | 8/1965 | Frisch et al. | 260/77.5 AB |
| 3,694,389 | 9/1972 | Levy | 260/77.5 AB |
| 3,711,440 | 1/1973 | Chadwick | 260/47 CB |
| 3,899,467 | 8/1975 | Bonk et al. | 260/47 CB |
| 3,933,937 | 1/1976 | Rhodes, Jr. et al. | 260/77.5 CR |
| 3,933,938 | 1/1976 | Rhodes, Jr. et al. | 260/77.5 AP |
| 4,035,467 | 7/1977 | Campbell et al. | 260/77.5 AP |

Primary Examiner—Eugene C. Rzucidlo
Attorney, Agent, or Firm—George A. Grove

[57] ABSTRACT

According to a preferred practice of the invention, thermoset polyurethanes are molded from a mixture of solid particles of hydroquinone di-(beta-hydroxyethyl)ether (HQEE) and zinc stearate dispersed in a liquid mixture of a polyether polyol and a liquid form of diphenylmethane diisocyanate. The use of the HQEE chain extender and the zinc stearate catalyst provides a unique one-shot molding mixture that is relatively unreactive at room temperature, but polymerizes and cures rapidly upon heating. It has a pot life of at least several hours and is suitable for use in injection molding equipment generally used in processing thermoplastic material.

3 Claims, No Drawings

CATALYZED ONE-SHOT SYSTEM FOR MOLDING THERMOSET POLYURETHANES

This invention relates to molding heat cured, thermoset polyurethanes from room temperature-stable, catalyzed dispersions of polyols and isocyanates.

It has proven difficult to adapt thermosetting resins to high speed molding processes like the injection molding of thermoplastic resins. Mixtures of thermosetting polyurethane forming reactants formulated to rapidly polymerize and cure in a mold have little or no pot life and tend to set-up in the equipment. Such reactants can be mixed without a catalyst so they do not cure prematurely, but then they react too slowly, even in heated molds, to be commercially competitive. Another method of extending the pot lives of such mixtures is to chemically block or otherwise modify the reactants so they do not react before they are molded, but this is time consuming and expensive.

Thermoset polyurethane articles are commonly formed by the so-called "RIM" (reaction injection molding) process. This process requires expensive specialized metering and rapid mixing equipment. Accurately proportioned, highly catalyzed streams of low viscosity polyol and isocyanate liquids are forced through small orifices at high pressure into a mixing chamber for the purpose of very rapidly forming a uniform mixture of the reactive urethane forming constituents. The mixture is immediately injected into a mold. Once combined, the components react very quickly to form thermoset polyurethane articles. Because the reaction proceeds so rapidly, the RIM process must be carefully monitored and it is not uncommon for incomplete mixing to occur or for the reactants to set before they reach the mold and debilitate the equipment for long periods.

It is an object of this invention to provide a catalyzed one-shot mixture of an isocyanate, a polyol, and a diol chain entender for molding polyurethane elastomers. The composition can be easily premixed and stored at normal room temperatures for use as needed over the course of at least several hours. Moreover, the composition will cure rapidly in a heated mold and form a thermoset polyurethane article with good tensile strength and modulus.

It is further object of the invention to provide a method of molding thermoset polyurethane compositions in available high speed molding equipment of the type used to mold thermoplastics.

It is a more specific object to provide one-shot molding compositions containing all the necessary reactive ingredients for forming a thermoset polyurethane, the viscosity of which can be regulated to conform to the requirements of such molding equipment. Moreover, such compositions cure rapidly enough in heated molds to be commercially practicable.

BRIEF SUMMARY OF THE INVENTION

In accordance with a preferred embodiment of our invention, these and other objects are accomplished by dispersing fine particles of hydroquinone di-(beta-hydroxyethyl)ether (HQEE) and zinc stearate in a liquid mixture of a triol and diphenylmethane diisocyanate (MDI). The solids are essentially unreactive with the liquids at room temperature, so the mixture has a pot life of at least several hours.

The moldable dispersion may be characterized by expressing the amounts of the reactive constituents in terms of chemically equivalent proportions.

In a preferred practice of the invention, one chemical equivalent of a liquid form of diphenylmethane diisocyanate is mixed with 0.05 to 0.50 chemical equivalent of a liquid polyoxypropylene triol having an equivalent weight of about 2000. From about 0.40 to 0.85 chemical equivalent of hydroquinone di-(beta-hydroxyethyl)ether, a diol chain extender, is dispersed in the isocyanate and triol so that there is a chemical equivalent excess of up to 10% of the isocyanate. A catalytic amount of zinc stearate, about 0.05% by weight of the other components, is dispersed in the mixture.

The dispersion may be molded by virtually any desired technique. If, for example, it is injection molded, the mixture is poured or pushed into the barrel of the reciprocating screw injection molding machine. The barrel of the machine is equipped with cooling means to prevent heat transfer from the mold back to the barrel. The mold is heated to a temperature of about 150° C. and the dispersion is injected at a suitable pressure. As the dispersion is heated in the mold, the zinc stearate catalyst is activated, and the hydroxyl-isocyanate cross-linking reaction proceeds quickly. The article cures and hardens in about two minutes, and is removed from the mold.

DETAILED DESCRIPTION OF THE INVENTION

In accordance with our invention, a polyol with a functionality greater than two is used as part of our dispersion to form a cross-linked, thermoset polyurethane. Particularly useful in the practice of this invention are liquid polyoxypropylene triols having an approximate hydroxyl functionality of three and an equivalent weight of the order of 2000. Also useful are polyoxypropylene triols in which small portions of thermoplastic segments such as styrene acrylonitrile have been reacted into the polyether chains. By varying the amount and character of such thermoplastic graft segments, triols of different viscosities can be made. Since these triols form a major part of the liquid medium of the molding dispersions of this invention, the viscosity of the subject molding compounds can be particularly adjusted for use in different types of equipment by proper selection of the triol. For example, a low viscosity polyol can be used if a dispersion is to be poured or pumped into a mold. A higher viscosity polyol is used if the dispersion is to be processed in equipment such as a thermoplastic injection molding machine where higher viscosities are required to retract the injection screw.

A typical polyol useful in the practice of the invention is Pluracol ® 581, a polyoxypropylene triol containing grafted SAN having a viscosity of about 2800 centipoise at 25° C., and an equivalent weight of about 2150, manufactured by BASF Wyandotte.

The isocyanate employed in the practice of the invention is preferably a liquified form of diphenylmethane diisocyanate. Pure MDI is a solid at room temperatures. We prefer to modify it so that it is an isocyanate terminated liquid. One way of doing this is to melt MDI crystals and react in a small amount of a short chain diol to form a liquid isocyanate terminated MDI adduct with a lower melting point. One such commercially produced adduct is Isonate ® 181 made by the UpJohn Company. It has an equivalent weight of about 181 and a viscosity of about 850 centipoise at room temperature.

An alternate method of liquifying MDI is to prereact it with the polyoxypropylene triols described above. An excess of the isocyanate is used so that an isocyanate terminated liquid is formed. Hereinafter "MDI" refers to such liquified adducts of diphenylmethane diisocyanate.

Certain diols, commonly referred to as chain extenders, are reactive with terminal isocyanate groups. They are added to isocyanate-high molecular weight polyol mixtures to add tensile strength and modulus to the cured polyurethanes formed from such mixtures. Hydroquinone di-(beta-hydroxyethyl)ether has been found to be the suitable diol chain extender for the practice of this invention. It is a solid at room temperatures and can be easily dispersed in the liquid isocyanates and polyols of this invention without dissolving or substantially reacting. More commonly used diol extenders are butane diol and ethylene glycol, both liquids at room temperature. When these are mixed with the liquid forms of MDI and polyols described herein to form zinc stearate dispersions, the polyurethane cross-linking reaction proceeds so quickly that the pot life of this system is less than a half hour. However, when HQEE is used, the pot life of zinc stearate catalyzed dispersions is at least several hours at room temperatures.

Similarly, the suitable catalyst for the hydroxylisocyanate cross-linking reaction in these one-shot systems has been found to be zinc stearate. It can be incorporated in an MDI-polyol-HQEE polyurethane forming mixture without causing it to cure prematurely at room temperatures. The use of a catalytic amount of zinc stearate, above 0.05% by weight of the composition, decreases the heat cure time of the mixture from over one hour to less than three minutes. However, zinc stearate is insoluble in the other components at room temperature and our tests have shown that it has virtually no catalytic effect until about 80° C. Once it is activated by heating, the exothermic polyurethane isocyanate-hydroxyl cross-linking reaction proceeds rapidly and the polymer cure is generally complete in just a few minutes.

The one-shot molding dispersions of this invention are typically prepared at room temperature by adding HQEE and zinc stearate powders to the liquid polyoxypropylene triol in a mechanical mixer and then adding MDI. However, the components can be mixed in any order so long as a uniform dispersion is formed.

An alternative method of dispersing the HQEE in the liquid component is to melt it in the polyol. As the polyol cools, it recrystallizes out uniformly throughout the dispersion. When this mixture cools to room temperature, the zinc stearate and MDI are added.

The mixing of the dispersions can be accomplished in any suitable equipment such as impeller mixers, paddle mixers, dough mixers, and the like, preferably equipped with cooling means for making large batches. It will be appreciated that the dispersions must be mixed and maintained at temperatures below the activation temperature of the zinc stearate catalyst, and preferably below 50° C. to prevent premature polyurethane cross-linking reactions.

Heated molds are used in the practice of the invention to activate the zinc stearate catalyst in the mixtures and promote the polyurethane polymerization reaction. Suitable mold temperatures are in the range of about 120° to 170° C., preferably in the range of about 135° to 150° C. Higher temperatures decrease mold cure time, but mold temperatures must not be so high as to degrade the polyurethanes. With a mold temperature of about 150° C., an article can ordinarily be removed from the mold in about two minutes.

Significant increases in the stiffness, strength, hardness, and dimensional stability of the subject polyurethanes can be gained by reinforcing them with fibrous fillers such as milled or chopped fiberglass. These fillers may be mixed with the dispersion and molded by any of the above mentioned means. This is a significant improvement over RIM systems which cannot easily accommodate fiber fillers. Moreover, the addition of fillers to the dispersions does not adversely effect their pot lives.

The invention will be further understood from the following specific examples.

EXAMPLE I

A molding composition was made according to a preferred practice of the invention by stirring amounts proportional to 0.73 chemical equivalent (72 grams) of hydroquinone di-(beta-hydroxyethyl)ether powder and 1 gram of zinc stearate powder into about 0.19 chemical equivalent (380 grams) of Pluracol® 581 made by BASF Wyandotte. Pluracol® 581 is a polyoxypropylene triolstyrene acrylonitrile graft polyol which is liquid at room temperatures. To this mixture approximately 1.0 chemical equivalent (181 grams) of Isonate® 181 was added. The molding dispersion has a viscosity of about 300 poise and was observed to remain essentially unreacted and workable for about 8 hours.

A portion of the composition was poured into the barrel of a New Britain Model 75 reciprocating screw injection molding machine. The machine was equipped with a water jacket to maintain the barrel temperature at about 16° C. The mold was heated to a temperature of about 150° C. to speed the cure time.

The dispersion was injected into the heated mold at a pressure of about 10 megapascals. After two minutes a stiff thermoset polyurethane article was removed from the mold.

EXAMPLE II

In this example, a molding composition was formed as in Example I with the reactive ingredients being combined in amounts proportional to 1.0 chemical equivalent of Isonate® 181, 0.46 chemical equivalent HQEE, 0.46 chemical equivalent Pluracol® 581 and 0.1% by weight of the mixture of zinc stearate.

A portion of the mixture was molded as in Example I, and a rubbery, elastomeric thermoset polyurethane article was produced.

EXAMPLE III

In this example, a molding composition was formed as in Example I with the reactive ingredients being combined in amounts proportional to 1.0 chemical equivalent of Isonate® 181, 0.84 chemical equivalent HQEE, 0.06 chemical equivalent Pluracol® 581, and 0.1% by weight of the mixture of zinc stearate.

A portion of the mixture was molded as in Example I, and a hard, smooth surfaced thermoset polyurethane article was produced.

EXAMPLE IV

In this example, a molding composition was formed by a modified technique. The same constituents in the same chemical equivalent proportions as used in Example I were combined as follows. The triol, Pluracol®

581, was first heated to a temperature of 110° C. The HQEE was stirred into the hot polyol and the mixture was heated to about 125° C., melting the HQEE. The mixture as cooled with stirring to about 40° C. and the HQEE recrystallized uniformly throughout the Pluracol. After further cooling to room temperature, the zinc stearate powder and the MDI were then added and the dispersion was molded as in Example I. The composition had a pot life of over 8 hours.

EXAMPLE V

A dispersion was formed as in Example I with the addition of 20% by weight of one quarter inch milled fiberglass filaments. The filled dispersion had an initial viscosity of about 500 poise and was easily processed in the injection molding machine as described in Example I above. It had a workable pot life of over 8 hours.

EXAMPLE VI

A dispersion was formed as in Example I, and flat 6 inch × 6 inch × ⅛ inch slabs were molded from the dispersion in a compression press at a temperature of 160° C. with an in-mold time of about 5 minutes. A second dispersion was formed in the same way but without the zinc stearate catalyst. Slabs were molded from this uncatalyzed mixture in a compression press as above with in-mold cure times of 15, 30 and 60 minutes.

Tensile test strips were cut from the molded slabs and subjected to strength and elongation (ASTM-D790) tests at −29° and +23° C. The flexural modulus of the samples was determined according to ASTM-6838 at −29° and +70° C., and the modulus ratio at these temperatures was calculated. The results are shown in the table.

|  | Cure Time at 149° C. (min) | Tensile Strength (MPa) | | Tensile Elongation (%) | | Flexural Modulus (MPa) | | Modulus Ratio |
| --- | --- | --- | --- | --- | --- | --- | --- | --- |
|  |  | −29° C | 23° C | −29° C | 23° C | −29° C | 70° C | −29° C/70° C |
| Catalyzed |  |  |  |  |  |  |  |  |
|  | 5 | 32.8 | 16.7 | 30 | 130 | 365 | 104 | 3.5 |
| Uncatalyzed |  |  |  |  |  |  |  |  |
|  | 15 | 27.9 | 13.1 | 10 | 40 | 485 | 90 | 5.4 |
|  | 30 | 29.1 | 13.7 | 20 | 45 | 412 | 83 | 5.0 |
|  | 60 | 32.8 | 15.9 | 15 | 50 | 522 | 117 | 4.5 |

As evidenced by the tensile strength data in the table, the cure times for the uncatalyzed dispersion are much longer than for the dispersion containing zinc stearate. It took a 60 minute cure of the uncatalyzed dispersion to achieve a −29° C. tensile strength value of 32 MPa whereas in the catalyzed sample, a cure time of only 5 minutes was needed to reach an equivalent tensile strength. Even after a 60 minute cure, the uncatalyzed samples did not reach high or low temperature tensile elongation values as good as those achieved in the catalyzed sample. For example, the catalyzed sample exhibited tensile elongations of 30% at −29° C. and 130% at 23° C. The uncatalyzed samples exhibited only 15% tensile elongation at −29° C. and only 50% tensile elongation at 23° C.

Similarly, the uncatalyzed samples had poor flexural modulus properties. The modulus ratio is a measure of the uniformity of modulus values over wide temperature ranges. The ratio is calculated by dividing a low temperature flexural modulus value by a high temperature flexural modulus value. The closer the ratio is to one, the better the modulus properties of the sample are. As can be seen in the table, uncatalyzed samples had a modulus ratio of about 4.5 for −29° and +70° C. after an hour cure time whereas the catalyzed samples had a much better modulus ratio of 3.5 after only a 5 minute cure time.

Thus, the subject zinc stearate catalyzed dispersions have a practical pot life and are still rapidly moldable into polyurethanes having excellent physical properties. In fact, the difference in properties between the zinc stearate catalyzed polyurethanes and the uncatalyzed polyurethanes suggests that there are significant structural differences in the products.

EXAMPLE VII

In this example a molding composition was made by modifying MDI crystals to form a liquid MDI-polyol medium in which the zinc stearate and hydroquinone di-(beta-hydroxyethyl) ether were dispersed. Approximately two chemical equivalents (250 grams) of MDI crystals were melted and about 0.3 chemical equivalents (600 grams) of Pluracol® 667, a polyoxypropylene triol made by BASF Wyandotte, were added. The mixture was heated to 80° C. and one gram of zinc stearate was added with stirring. The mixture was reacted for an hour at 80° C. to form an isocyanate terminated liquid. The mixture was cooled to 30° C., and 1.5 chemical equivalents (150 grams) of HQEE powder were stirred in. The resulting dispersion had a viscosity of about 76 poise and was molded in a compression press at a temperature of 150° C. for two minutes.

While our invention has been disclosed in terms of specific embodiments, it will be appreciated that other forms could readily be adapted by one skilled in the art. Accordingly, the scope of our invention is to be considered limited only by the following claims.

What is claimed is:

1. A method of molding a thermoset polyurethane article comprising;
   forming a moldable dispersion of thermosetting polyurethane forming constituents consisting essentially, in chemical equivalents, of;
   100 equivalents of an isocyanate selected from the group consisting of diphenylmethane diisocyanate and liquid isocyanate terminated reaction products of diphenylmethane diisocyanate and a diol,
   about 40 to 85 equivalents of hydroquinone di-(beta-hydroxyethyl)ether,
   an amount of a liquid polyol having a hydroxyl functionality of greater than two and an equivalent weight of the order of 2000, and
   a catalytic amount of zinc stearate,
   the proportions of said isocyanate, hydroquinone di-(beta-hydroxyethyl)ether, and polyol being such that there is a chemical equivalent excess of up to 10% of said isocyanate, said isocyanate being combined with said other constituents at a temperature below the activation temperature of said zinc stearate so that said dispersion has a room temperature pot life of at least several hours, introducing said dispersion into a mold, and heating said dispersion therein to a temperature whereat said catalyst is activated to react said constituents, thereby forming said thermoset polyurethane article.

2. A method of molding a thermoset polyurethane article comprising;

forming a moldable dispersion of thermosetting polyurethane forming constituents consisting essentially, in chemical equivalents, of;

100 equivalents of an isocyanate selected from the group consisting of diphenylmethane diisocyanate and liquid isocyanate terminated reaction products of diphenylmethane diisocyanate and a diol, about 40 to 85 equivalents of hydroquinone di-(beta-hydroxyethyl)ether, about 5 to 50 equivalents of a liquid polyoxypropylene triol having an equivalent weight of the order of 2000, and a catalytic amount of zinc stearate, said isocyanate being combined with said other constituents at a temperature below the activation temperature of said zinc stearate, the proportions of said isocyanate, hydroquinone di-(beta-hydroxyethyl)ether, and triol being such that there is a chemical equivalent excess of up to 10% of said isocyanate, said dispersion having a room temperature pot life of at least several hours, introducing said dispersion into a mold, and heating said dispersion therein to a temperature whereat said catalyst is activated to react said constituents, thereby forming said thermoset polyurethane article.

3. A method of molding a reinforced thermoset polyurethane article comprising;

forming a moldable dispersion comprising thermoset polyurethane forming constituents and a filler, said constituents consisting essentially, in chemical equivalents, of;

100 equivalents of an isocyanate selected from the group consisting of diphenylmethane diisocyanate and liquid isocyanate terminated reaction products of diphenylmethane diisocyanate and a diol, 40 to 85 equivalents of hydroquinone di-(beta-hydroxyethyl)ether, 5 to 50 equivalents of a liquid polyoxypropylene triol haviang an equivalent weight of the order of 2000, and a catalytic amount of zinc stearate, said isocyanate being combined with said other constituents at a temperature below the activation temperature of said zinc stearate, the proportions of said isocyanate, hydroquinone di-(beta-hydroxyethyl)ether, and triol being such that there is a chemical equivalent excess of up to 10% of said isocyanate, said dispersion having a room temperature pot life of a least several hours, introducing said dispersion into a mold, and heating said dispersion therein to a temperature whereat said catalyst is activated to react said constituents, thereby forming said polyurethane article.

* * * * *